United States Patent [19]

Dumargue et al.

[11] Patent Number: 4,601,422
[45] Date of Patent: Jul. 22, 1986

[54] DEVICE FOR FORMING AND WELDING BLANKS IN SUPERPLASTIC MATERIAL

[75] Inventors: Guy Dumargue, Boulogne; Jean L. Comerçon, Le Vesinet, both of France

[73] Assignee: Societe Nationale Industrielle et Aerospatiale, Paris, France

[21] Appl. No.: 743,517

[22] Filed: Jun. 11, 1985

[30] Foreign Application Priority Data

Jun. 19, 1984 [FR] France .................. 84 09572

[51] Int. Cl.⁴ ........................... B23K 37/00
[52] U.S. Cl. ................... 228/44.3; 34/242; 72/38; 72/448; 100/269 A
[58] Field of Search ............ 228/44.3, 265; 100/269 A; 72/38, 448; 264/DIG. 50; 34/242

[56] References Cited

U.S. PATENT DOCUMENTS

| | | | |
|---|---|---|---|
| 3,572,666 | 4/1969 | Fehr | 34/242 |
| 3,926,032 | 1/1975 | Brooks et al. | 72/448 |
| 3,934,441 | 1/1976 | Hamilton et al. | 72/60 |
| 3,974,673 | 8/1976 | Fosness et al. | 72/38 |

FOREIGN PATENT DOCUMENTS 2076722 5/1981 United Kingdom.

Primary Examiner—Nicholas P. Godici
Assistant Examiner—Karen Skillman
Attorney, Agent, or Firm—Marshall, O'Toole, Gerstein, Murray & Bicknell

[57] ABSTRACT

The invention relates to a device for forming and welding blanks in a material able to become superplastic, of the type comprising cooperating dies between which such blanks are placed, which dies are respectively mounted on a lower frame and on an upper frame of the device.

The device according to the invention is remarkable in that the lower frame is constituted of a base and of a vertically movable part carrying a die, in that an inflatable bladder is interposed between the base and the movable part of the lower frame, in that a mechanical a lock is provided for connecting together the the base and the upper frame, when the latter is in low position, and in that, in the low and locked position of the upper frame with respect to the base of the lower frame, cooperation of the dies is achieved by controlling the bladder.

8 Claims, 6 Drawing Figures

DEVICE FOR FORMING AND WELDING BLANKS IN SUPERPLASTIC MATERIAL

The present invention relates to a device for forming and welding blanks which are placed in a mold comprising dies defining the shape of a piece to be obtained and which are subjected to conditions in which their constituent material is superplastic, the forming resulting from a differential fluid pressure applied between the two faces of each blank, so that the blanks deform plastically to adapt to one part of said shape, and the welding of said blanks resulting from a mechanical and/or fluid pressure applied between said blanks.

It is known that superplastic materials have the property of becoming deformed when said materials are in the right conditions, similarly to molten glass or plastic materials; indeed, their elongation on break is then between 300% and over 2000%, against less than 100% in normal conditions. It is therefore possible to work these materials with methods similar to those used for plastic materials, such as for example blowing.

Some of these materials, such as Pb-Sn and Al-Zn alloys have the superplastic property at a moderate temperature and it is with them that the first forming trials have been made, because of their easy implementation (see on this point the article entitled "Superplasticity in an Al-Zn alloy" published in TRANSACTIONS from the A.S.M., volume 57, 1964, pages 980–990).

But most materials are superplastic only at high temperature, generally at half their melting point expressed in degrees Kelvins.

It is already known, notably from U.S. Pat. Nos. 3,340,101 and 3,595,060, from French Pat. No. 2,245,428 and from European Pat. No. 0,018,255, to use methods for forming a piece from a blank which is placed inside a mold in the shape of the piece to be obtained, and which is subjected to conditions in which its constituent material is superplastic, the forming resulting in a fluid pressure and/or depression applied to said blank in such a way that the latter is deformed so as to take on said shape.

Said forming methods present many advantages:

an important saving on raw material, compared with die stamping;

possibility to prepare the blanks before use (machining), this increasing the saving on material and reducing dimensioning, hence a reduction in costs and equipment, while obtaining a finished piece;

possibility to produce from standard sheets of metal found on the market;

possibility to produce very large pieces (the limits being those of the heating means);

possibility to use blanks made from welded sheets of metal (for outsizes, local reinforcements, etc. . . . );

possibility to combine the simultaneous forming operation of a plurality of blanks with an equally simultaneous diffusion bonding of said blanks;

possibility to obtain pieces without residual stresses;

forming without wrinklings;

relative accuracy of shape less than $10^{-3}$;

condition of surface (on the mold side) identical to that of the equipment;

gain on the machining of the formed pieces, as only the shape surface may require to be machined.

However, these known methods, despite their many advantages, have not really been widely developed, because, up to now, they have been carried out with tools of the heating press type, originally designed for other techniques and adapted somehow to superplastic forming. Said tools, which have been used up to now and which are not specific to superplastic forming and to diffusion bonding, have proved to be expensive and relatively ill-adapted to the purpose.

It is the object of the present invention to overcome this drawback by proposing a particularly self-contained tool, of relatively low cost, adapted to take part in the development of methods of forming superplastic materials.

The invention proposes to this effect a device for the forming and welding of blanks in a material able to become superplastic, of the type comprising cooperating dies between which the blanks are placed and which are mounted respectively on a lower frame and on an upper frame of said device, said upper frame being vertically movable between a position close to the lower frame and a position away from said lower frame, heating means being provided to bring said blanks to a superplastic state, as well as means of applying between the two faces of each of said blanks, a differential fluid pressure, said device being remarkable in that said lower frame is constituted of a base and of a vertically movable part carrying a die, in that an inflatable bladder is interposed between said base and said lower part, in that mechanical locking means are provided for joining together the said base and upper frame, when the latter is in close position, and in that, in the close and locked position of the upper frame with respect to said base of the lower frame, cooperation of the dies is achieved by controlling said bladder.

Thus, according to the invention, the force required for clamping the blanks between the dies is obtained by said inflatable bladder, which is for example supplied with compressed air. Due to this particular structure, the dies clamping force can easily be adjusted in relation to the blanks surfaces to be soldered and the pressure exerted on said surfaces is uniform. Control of the pressure of the fluid supplying the bladder enables the adjustment of the welding pressure, whatever the distance between the dies, namely whatever the thickness of the blanks.

Preferably, and in particular, in order to avoid the presence of a system for the vertical guiding of the movable part with respect to said base, while the isostatic contact between the dies is ensured, said bladder is so designed that its opposite faces rest flat, over as large a surface as possible, first on said base, and second on said movable part.

Advantageously, to position the blanks as accurately as possible between the dies, access to the lower die of the device should be total. Also, according to a special feature of the invention, said lower frame is mounted so as to be movable between a position in which it is plumb with said upper frame and a position in which it is quite the opposite, and vice-versa.

It will be noted that such a design makes it possible to automate the operations of loading of the blanks onto the lower die and of unloading the formed and welded pieces obtained from said blanks. Such automation is all the more justified that the blanks have to be heated to high temperatures for their forming and welding (around 1000° C.), so that the working conditions around the device can be very difficult. It will further be noted that, as the heating means only enable to reach such temperatures after relatively long periods of time, said means can remain plugged in throughout the loading of the blanks, in order to shorten the duration of the forming and welding cycles.

Due to the mechanical locking of the upper frame with respect to the base of the lower frame, it is possible to absorb the pressures applied between the dies during the forming and welding operations. However, the two lower and upper frames must be capable of moving one with respect to the other. It is therefore advantageous to perform said locking operation in as simple a manner as possible, without having to use vertical or horizontal guiding elements. According to another special feature of the invention, the mechanical locking of the upper frame on the base of the lower frame is achieved by means of removable pins traversing holes provided respectively in certain parts of the lower and upper frames and which coincide when said lower frame is plumb with said upper frame and when the latter is in the close position.

Preferably, a horizontal moving track is provided for said lower frame and, for the upper frame, vertical displacement means which rest against the support of said horizontal track. Said support may be constituted either by the ground on which rests the device, or by a stand provided for said device.

It is also known that the forming and/or welding of superplastic blanks often have to be carried out in a neutral atmosphere. And to this effect, a tightness, if only a partial one, must be created in a space around the dies, in order to replace the ambient air therein with a neutral gas. Such tightness is all the more difficult to achieve that the temperature conditions are high.

In order to obtain the said tightness, the invention proposes a peripheral wall integral with the upper frame and surrounding the die carried by said upper frame, said wall projecting downwardly with respect to said die, as well as a peripheral groove made in the lower frame, and surrounding the die carried by said lower frame, said groove being filled with a divided refractory material. Then, in the position where the two frames are close together, the lower edge of the peripheral wall can penetrate in the divided refractory material to isolate the space surrounding said dies, from the outside. Said space can then be emptied and a neutral gas introduced therein.

Advantageously, the depth and width of the groove are so calculated as to allow variations of vertical and horizontal position of the peripheral wall inside said groove, due for example to the action of the inflatable bladder and/or of the heat. The divided refractory material may be constituted of a lower layer of powder, topped with a layer of granules or beads. The resulting tightness becomes more efficient as the peripheral wall sinks more deeply into the said groove.

Each die may be heated by means of an electric heating platen supporting it. Each platen may be divided into a plurality of heating zones regulated independently one from the other. It is thus possible to go through the temperature cycles in the best possible way and to obtain the desired temperature gradient on said dies.

Advantageously, to achieve heat insulation of the heating platens, said platens are carried by heat-insulating blocks. Such blocks eliminate the need of having to use a cooling circuit, they limit losses of energy and and distribute pressure stresses throughout the whole surface of said heating platens.

The invention will be more readily understood on reading the following description with reference to the accompanying drawings in which identical elements bear the same reference numerals. In these drawings.

Figure 6:
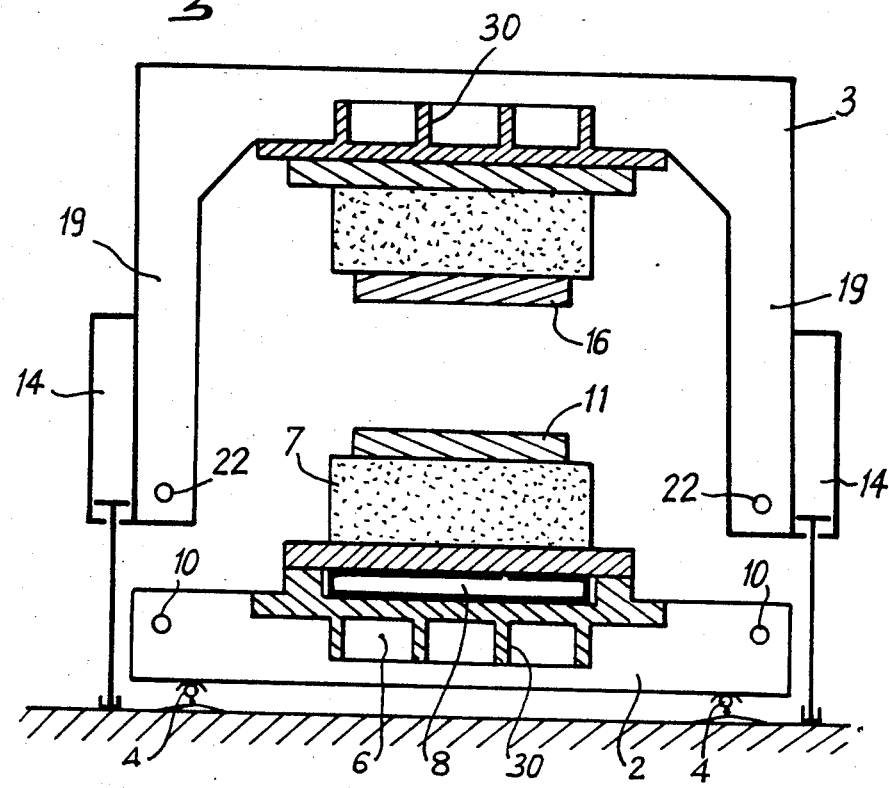

FIG. 6 diagrammatically illustrates a variant embodiment of the device according to the invention, in which the ground replaces the lower stand.

The embodiment according to the invention illustrated in FIGS. 1 to 4, comprises a support or stand 1 on which rest a lower frame 2 and an upper frame 3.

The lower frame 2 is mounted for moving horizontally with respect to the support 1, due to a rolling or sliding track 4 and to driving means 5. The lower frame 2 is constituted of a base 6 and of a movable upper part 7, between which is inserted an inflatable bladder 8. The base 6 rests on the rolling or sliding track 4 and comprises lateral lugs 9, provided with holes 10. The movable part 7 carries a die 11 (not shown in FIG. 1) adapted to be heated by an electric heating platen 12, resting on a heat-insulating block 13. The movable part 7 rests by its weight on the base 6, no vertical guiding being provided for said movable part, due to the fact that the bladder is in contact with the base 6 and with the movable part 7 by wide flat areas. A flexible pipe 20 enables the passage and the protection of the electrical cables between the frame 2 and the support 1.

The upper frame 3 is mounted for moving vertically with respect to the support 1, via jacks 14. Said upper frame 3 comprises an upper plate 15 on which is fixed a die 16, heated by an electric heating platen 17, thermally-insulated from the platen 15 by way of an insulating block 18.

The upper plate 15 is integral with downwardly-directed vertical side walls 19, provided at their lower part with lugs 21 perforated with holes 22.

From the structural design described hereinabove, it is seen that the lower frame 2 can occupy two positions by horizontal translation: in the first position illustrated in FIGS. 1 and 2, the frame 2 is moved horizontally aside from the frame 3, so that it is easy to position the blanks to be formed and welded on the lower die 11 of the device; in the second position, illustrated in FIGS. 3 and 4, the frame 2 is plumb with the frame 3, underneath the latter. Said frame 2 can easily go from one of these positions to the other by actuating driving means 5.

Figure 1:
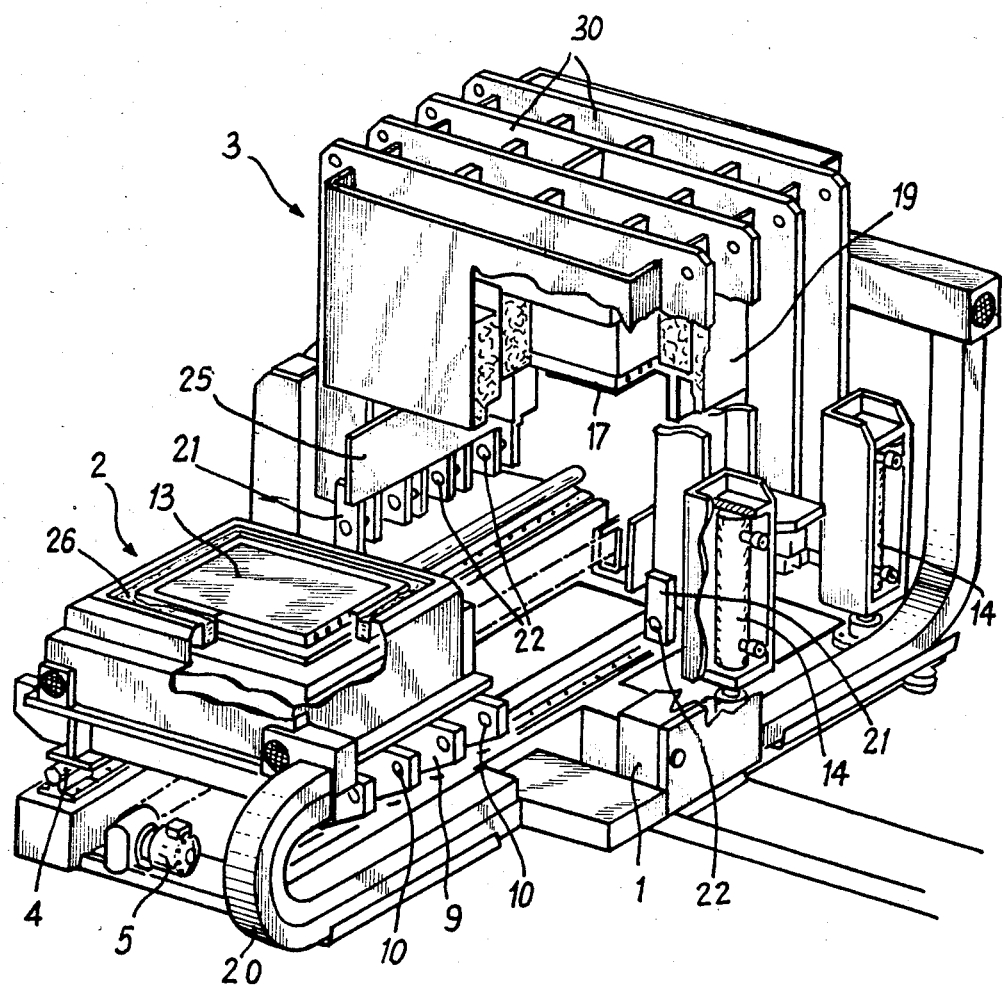
FIG. 1 is a diagrammatical and partly stripped perspective of one embodiment of the device according to the invention.
Figure 2:
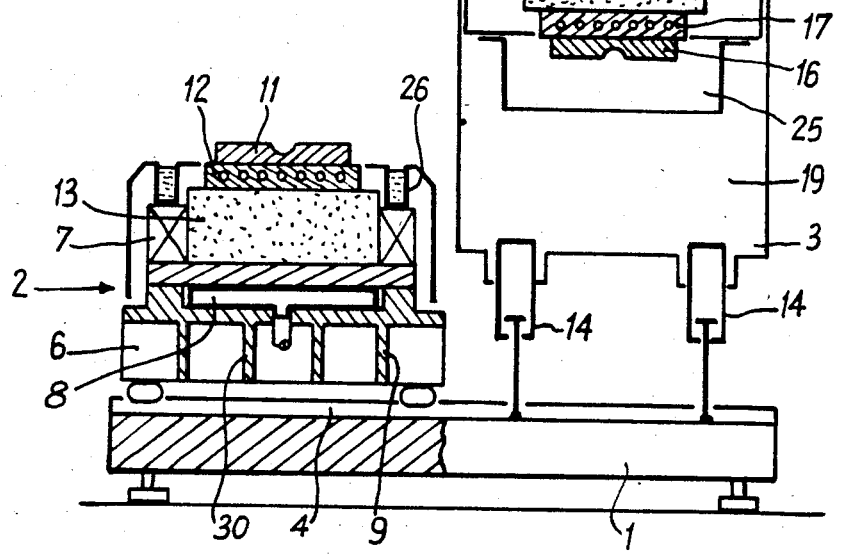
FIG. 2 is a diagrammatical cross-section of the device according to the invention, in which the lower frame is shifted with respect to the upper frame.
Figure 3:
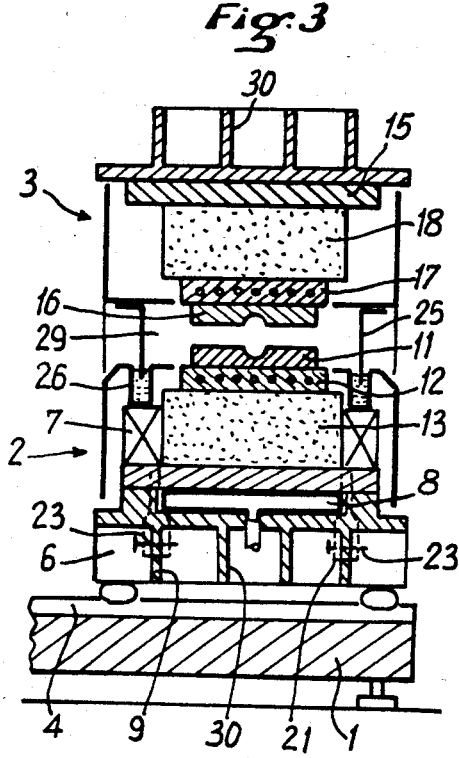
FIG. 3 is a diagrammatical cross-section of the device according to the invention in which the lower frame is locked with the upper frame.
Figure 4:
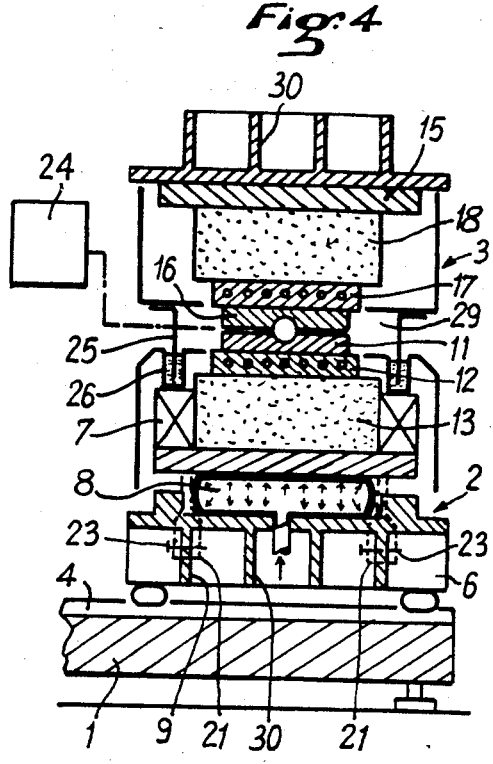
FIG. 4 is a diagrammatical cross-section of the device according to the invention, in the forming and welding position.

It is also clear from the foregoing that the upper frame 3 can also occupy two positions by vertical translation: in the first position, illustrated in FIGS. 1 and 2, the frame 2 is in high position, whereas in the second position, illustrated in FIGS. 3 and 4, said frame 3 occupies the low position. Passage from the high position to the low position and reciprocally is made possible by actuating the jacks 14.

When the frame is in vertical alignment with the frame 3 and when the latter is in the low position (FIGS. 3 and 4), the holes 10 in the lugs 9 and the holes 22 in the lugs 21 are in horizontal alignment, so that pins 23 may be introduced through these coinciding holes for mechanically locking the base 6 of the lower frame 2 with the upper frame 3.

Such a mechanical locking makes it possible to carry out the forming and welding of the superplastic blanks (not shown) inserted between the dies 11 and 16; indeed, said blanks having been accurately positioned on the lower die 11 when the frame 2 was horizontally moved aside from the frame 3, the bladder 8 is inflated (FIG. 4), so that the movable part 7 is raised and the lower die 11 forces the blanks against the upper die 16. Said blanks are then subjected to a rise in temperature by means of the heating platens 12 and 17, to a superplastic forming by application of a differential pressure between their faces owing to a source of pressure or depression 24 connected to said dies 11 and 16, and to a diffusion bonding owing to the pressure exerted thereon as a result of the inflating of the bladder 8.

The superplastic forming process may be of the type described in European Patent Application 0 018 255. Regulating of the heating produced by the heating platens 12 and 17, of the differential pressure generated by the source 24 and of the pressure between the dies 11 and 16 exerted by the bladder 8 may be performed with a microprocessor (not shown).

Figure 5:
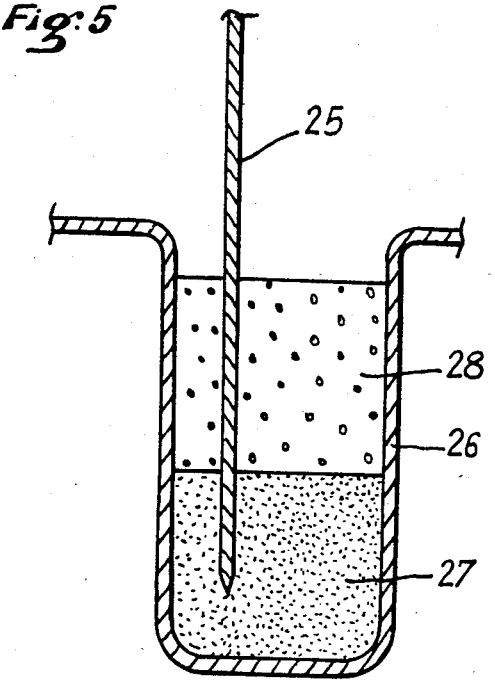
FIG. 5 is a partial cross-section on an enlarged scale of the sealing joint surrounding the dies.

In order to keep the working area of the blanks in a neutral gas environment, a joint is provided around the dies 11 and 16, said joint being formed at least as soon as the frames 2 and 3 are locked together (FIG. 3). Such a joint comprises (see also FIG. 5), on the one hand, a peripheral wall 25, integral with the upper frame 3, surrounding the upper die 16 and projecting downwardly with respect to said die and, on the other hand, a peripheral groove 26, integral with the lower frame 2, surrounding the lower die 11 and filled with a divided refractory material, such as for example a layer 27 of alumina powder topped with a layer 28 of ceramic beads.

Thus, when the peripheral wall 25 penetrates into the divided material 28 of the peripheral groove 26, namely when the frame 3 passes from its high position to its low position (FIG. 3), the space 29 surrounding the dies 11 and 16 and defined by the wall 25 is isolated from the outside atmosphere. It is then possible to replace the air contained therein with a neutral gas. The depth and width of the groove 26 are provided so as to allow, on the one hand, the subsequent raising up of the movable part 7 (FIGS. 4 and 5) and, on the other hand, horizontal variations in the position of the wall 25 with respect to the groove 26, due to deformations under heat.

According to the variant embodiment of the device according to the invention illustrated in FIG. 6, the horizontal support or stand 1 has been eliminated and the lower frame 2 rests directly on the ground via the moving track 4. In this case, the jacks 14, instead of being anchored in the stand 1, are anchored directly in the ground.

We claim:

1. Device for forming and welding blanks in a material able to become superplastic comprising:
    cooperating dies between which are placed the said blanks and which are respectively mounted on a lower frame and on an upper frame of said device, said upper frame being vertically movable between a position close to said lower frame and a position away from said lower frame,
    heating means for bringing said blanks to the superplastic state,
    means for applying a differential fluid pressure between the two faces of each of said blanks, and
    means for isolating the working area of said blanks from the environment, said means comprising a peripheral wall integral with the upper frame, said wall surrounding the die carried by said upper frame and projecting downwardly with respect to said die, and a peripheral groove integral with the lower frame, said groove surrounding the die carried by said lower frame and containing a lower layer of a refractory powder and an upper layer of ceramic beads, said peripheral wall being adapted to penetrate said layers and to form a hermetic seal therewith.

2. Device as claimed in claim 1, wherein said lower frame is constituted of a base and of a vertically movable part carrying the die and the peripheral groove, an inflatable bladder is interposed between said base and said movable part of said lower frame, mechanical locking means are provided for interconnecting said base and the upper frame carrying the peripheral wall when said upper frame is in close position, and, when said upper frame is in close and locked position with respect to said base of said lower frame, the cooperation between the dies is achieved by controlling said bladder.

3. Device as claimed in claim 2, wherein said bladder is such that its opposed faces rest flat over large surfaces, on the one hand, against said base and on the other hand against said movable part.

4. Device as claimed in claim 1, wherein said lower frame is movably mounted in order to be moved between a position in which it is plumb with said upper frame and a position in which it is completely out of said plumb position, and vice-versa.

5. Device as claimed in claim 4, wherein said mechanical locking means are constituted by removable pins traversing holes made respectively in parts of the lower and upper frames and which coincide when said lower frame is plumb with said upper frame and when the latter is in its close position.

6. Device as claimed in claim 4, wherein a horizontal moving track is provided for said lower frame, and for the upper frame, vertical moving means which rest on the support of said horizontal moving track.

7. Device as claimed in claim 1, wherein said dies are heated by electric heating platens carrying them.

8. Device as claimed in claim 7, wherein said electric heating platens are carried by heat-insulating blocks.

* * * * *